(12) United States Patent
Birnkrant et al.

(10) Patent No.: US 12,253,457 B2
(45) Date of Patent: Mar. 18, 2025

(54) ENVIRONMENTAL ENCLOSURE FOR A TRANSPORT GAS SENSOR

(71) Applicant: Carrier Corporation, Palm Beach Gardens, FL (US)

(72) Inventors: Michael J. Birnkrant, Wethersfield, CT (US); Marcin Piech, East Hampton, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 238 days.

(21) Appl. No.: 17/949,772

(22) Filed: Sep. 21, 2022

(65) Prior Publication Data

US 2023/0094980 A1 Mar. 30, 2023

Related U.S. Application Data

(60) Provisional application No. 63/250,391, filed on Sep. 30, 2021.

(51) Int. Cl.
*G01N 21/25* (2006.01)
*G01N 21/35* (2014.01)
*G01N 21/3504* (2014.01)

(52) U.S. Cl.
CPC ........ *G01N 21/255* (2013.01); *G01N 21/3504* (2013.01); *F25B 2500/222* (2013.01); *G01N 2201/022* (2013.01)

(58) Field of Classification Search
CPC .............. G01N 21/255; G01N 21/3504; F25B 2500/22; F25B 2500/222; F25B 49/005; F24F 11/36
See application file for complete search history.

(56) References Cited

U.S. PATENT DOCUMENTS

| 3,455,792 A | 7/1969 | Ohta |
| 4,947,548 A | 8/1990 | Bentley |

(Continued)

FOREIGN PATENT DOCUMENTS

| CN | 201110830 Y | 9/2008 |
| CN | 102198358 A | 9/2011 |

(Continued)

OTHER PUBLICATIONS

Extended European Search Report for European Application No. 22199212.6; Report Mail Date Feb. 4, 2023 (pp. 1-9).

(Continued)

*Primary Examiner* — Marc E Norman
(74) *Attorney, Agent, or Firm* — CANTOR COLBURN LLP (57) ABSTRACT

A refrigerant detection assembly operable to detect refrigerant mixed with air includes a housing having an internal cavity fluidly connected with an ambient atmosphere surrounding the housing via an opening. A subassembly mounted within the internal cavity includes an air chamber fluidly connected with the internal cavity, a non-dispersive infrared sensor operably coupled to the air chamber, a printed circuit board, and a heat conduction plate mechanically and thermally coupled to the printed circuit board. At least one insulator is arranged within the internal cavity at a position between a portion of the subassembly and the housing. A shell is connectable to the housing in overlapping arrangement with the opening. The shell has at least one shell opening formed therein such that a flow path extends from the shell opening, through the opening formed in the housing to the internal cavity, and into the air chamber.

20 Claims, 4 Drawing Sheets

(56) References Cited

U.S. PATENT DOCUMENTS

| | | | |
|---|---|---|---|
| D320,212 S | 9/1991 | Someya | |
| D329,639 S | 9/1992 | Arvanitakis et al. | |
| D376,549 S | 12/1996 | Stimpfig et al. | |
| D389,808 S | 1/1998 | Yamada et al. | |
| 5,834,777 A | 11/1998 | Wong | |
| 5,886,348 A * | 3/1999 | Lessure | G01N 21/3504 |
| | | | 250/339.04 |
| 6,092,430 A | 7/2000 | Liston et al. | |
| D462,054 S | 8/2002 | Ma et al. | |
| 6,540,805 B2 | 4/2003 | Ohno et al. | |
| D488,815 S | 4/2004 | Hashimoto et al. | |
| D494,933 S | 8/2004 | Lu | |
| D496,905 S | 10/2004 | Hsu et al. | |
| D533,832 S | 12/2006 | Hock | |
| D577,674 S | 9/2008 | Long et al. | |
| D653,633 S | 2/2012 | Soyano | |
| D653,634 S | 2/2012 | Soyano | |
| D660,241 S | 5/2012 | Smith | |
| D660,243 S | 5/2012 | Smith | |
| D662,889 S | 7/2012 | Smith | |
| D668,978 S | 10/2012 | Kawaguchi et al. | |
| D686,174 S | 7/2013 | Soyano | |
| D689,446 S | 9/2013 | Soyano | |
| D702,242 S | 4/2014 | Tsuda et al. | |
| D718,717 S | 12/2014 | Commerford | |
| 8,950,237 B2 | 2/2015 | Cavalli et al. | |
| D727,758 S | 4/2015 | Sharifi | |
| D728,398 S | 5/2015 | Suzuki et al. | |
| 9,062,892 B2 | 6/2015 | Matsui | |
| D743,339 S | 11/2015 | Christensen et al. | |
| D767,498 S | 9/2016 | Jiang et al. | |
| 9,683,686 B2 | 6/2017 | Osborne et al. | |
| 9,707,504 B2 | 7/2017 | Chaen et al. | |
| 9,789,430 B2 | 10/2017 | Jackson | |
| 9,804,084 B2 | 10/2017 | Kouznetsov et al. | |
| D810,682 S | 2/2018 | Dai | |
| 10,027,146 B2 | 7/2018 | Christensen et al. | |
| 10,245,545 B2 | 2/2019 | Hara et al. | |
| 10,265,654 B2 | 4/2019 | Shibnya et al. | |
| 10,416,113 B2 | 9/2019 | Chen et al. | |
| 10,488,065 B2 | 11/2019 | Chen et al. | |
| 10,613,028 B2 | 4/2020 | Lee et al. | |
| D884,598 S | 5/2020 | Ebisawa et al. | |
| D887,968 S | 6/2020 | Ebisawa et al. | |
| D890,095 S | 7/2020 | Liao | |
| 10,703,341 B2 | 7/2020 | Kunze | |
| D895,549 S | 9/2020 | Kennedy et al. | |
| 10,781,750 B2 | 9/2020 | Owen | |
| D903,611 S | 12/2020 | Sannai et al. | |
| D916,654 S | 4/2021 | Ebisawa et al. | |
| D920,904 S | 6/2021 | Naito et al. | |
| D921,048 S | 6/2021 | Frank et al. | |
| D926,119 S | 7/2021 | Ebisawa et al. | |
| 11,051,525 B2 | 7/2021 | Tagawa et al. | |
| D929,462 S | 8/2021 | Frank et al. | |
| 11,096,301 B2 | 8/2021 | Mai | |
| 11,137,191 B2 | 10/2021 | Tagawa et al. | |
| 11,144,024 B2 | 10/2021 | Kamei et al. | |
| 11,361,121 B2 | 6/2022 | Birnkrant et al. | |
| 11,827,080 B2 * | 11/2023 | Kondrk | F25D 21/002 |
| 2010/0097049 A1 | 4/2010 | Lepine et al. | |
| 2012/0032667 A1 | 2/2012 | Sakamoto et al. | |
| 2015/0052864 A1 | 2/2015 | Jackson | |
| 2016/0315484 A1 | 10/2016 | Jung | |
| 2018/0327179 A1 | 11/2018 | Papas et al. | |
| 2018/0328643 A1 * | 11/2018 | Eddy | F25D 11/003 |
| 2020/0030734 A1 | 1/2020 | Hara et al. | |
| 2020/0185302 A1 | 6/2020 | Lu et al. | |
| 2020/0253226 A1 | 8/2020 | Kamei et al. | |
| 2020/0253227 A1 | 8/2020 | Kamei et al. | |
| 2020/0282356 A1 | 9/2020 | Kamei et al. | |
| 2020/0386431 A1 | 12/2020 | Kondrk et al. | |
| 2021/0033295 A1 | 2/2021 | Kamei et al. | |
| 2021/0156795 A1 | 5/2021 | Wan et al. | |
| 2022/0297510 A1 | 9/2022 | Kondrk et al. | |
| 2023/0097844 A1 * | 3/2023 | Birnkrant | G01N 21/255 |
| | | | 62/126 |

FOREIGN PATENT DOCUMENTS

| | | |
|---|---|---|
| CN | 103674883 A | 3/2014 |
| CN | 104566707 A | 4/2015 |
| CN | 205262956 U | 5/2016 |
| CN | 106016450 A | 10/2016 |
| CN | 106150783 A | 11/2016 |
| CN | 206402569 U | 8/2017 |
| CN | 206476084 U | 9/2017 |
| CN | 104280358 B | 11/2017 |
| CN | 107314583 A | 11/2017 |
| CN | 104677851 B | 2/2018 |
| CN | 207035593 U | 2/2018 |
| CN | 108593532 A | 9/2018 |
| CN | 108593587 A | 9/2018 |
| CN | 109507140 A | 3/2019 |
| CN | 208778103 U | 4/2019 |
| CN | 109733229 A | 5/2019 |
| CN | 209069825 U | 7/2019 |
| CN | 209802977 U | 12/2019 |
| CN | 110907385 A | 3/2020 |
| CN | 210196149 U | 3/2020 |
| CN | 111219302 A | 6/2020 |
| CN | 111644003 A | 9/2020 |
| CN | 110637197 B | 10/2020 |
| CN | 111879719 A | 11/2020 |
| CN | 212290294 U | 1/2021 |
| CN | 212454698 U | 2/2021 |
| CN | 212568464 U | 2/2021 |
| CN | 113007863 A | 6/2021 |
| CN | 213556026 U | 6/2021 |
| CN | 113507824 A | 7/2021 |
| CN | 214038815 U | 8/2021 |
| CN | 214757262 U | 11/2021 |
| EP | 1987346 B1 | 8/2010 |
| EP | 3584522 A1 | 12/2019 |
| EP | 3748260 | 12/2020 |
| EP | 3748260 A1 | 12/2020 |
| EP | 3858456 A1 | 8/2021 |
| GB | 6198499 | 3/2022 |
| JP | 1991060710 A | 7/1989 |
| JP | 1991060711 A | 7/1989 |
| JP | 1993015716 A | 5/1991 |
| JP | 1994182127 A | 12/1992 |
| JP | 2006046769 A | 10/2006 |
| JP | 3924202 B2 | 6/2007 |
| JP | 1731949 S | 12/2022 |
| KR | 101203120 B1 | 11/2012 |
| WO | 2019097607 A1 | 5/2019 |
| WO | 2020055633 A1 | 3/2020 |
| WO | 2020234404 A1 | 11/2020 |
| WO | 2021010233 A1 | 1/2021 |
| WO | 2021055221 A1 | 3/2021 |

OTHER PUBLICATIONS

"AM4205 NDIR A2L Refrigerant/Gasoline Sensor"; Specification; Item No. AM4205; Version: V0.1; Date: Jan. 20, 2021; www.gassensor.com.cn.

"AM4205 Ndir Refrigerant Sensor"; Specifications & Manual; Item No. AM4205; Version: V0.4; Date: Aug. 6, 2021; www.gaslab.com.

* cited by examiner

ENVIRONMENTAL ENCLOSURE FOR A TRANSPORT GAS SENSOR

CROSS-REFERENCE TO RELATED APPLICATIONS

This application claims the benefit of U.S. Provisional Application No. 63/250,391 filed Sep. 30, 2021, the disclosure of which is incorporated herein by reference in its entirety.

BACKGROUND

Exemplary embodiments of the present disclosure relate to refrigeration systems, and more particularly, to a detection assembly and a refrigeration system incorporating the detection assembly for detecting leaks of moderate to low global warming potential (GWP) refrigerants.

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. Historically, the refrigerant commonly used in such systems, such as R134A or R410A, has a high GWP. Although these refrigerants are effective coolants, the effect they can have on the environment has led to the institution of requirements that new refrigerants, which have moderate-to-low GWP values be employed instead.

Moderate-to-low GWP refrigerants (i.e., A2L refrigerants) can be mildly flammable, however, and thus their use in air conditioning systems can present risks that need to be addressed. In particular, to the extent that refrigerant leaks are possible in air conditioning systems, it is desirable to have an environmentally robust leak detection systems in place when A2L refrigerants are in use in heating, ventilation, air conditioning and refrigeration (HIV AC&R) products and other similar systems.

BRIEF DESCRIPTION

According to an embodiment, a refrigerant detection assembly operable to detect refrigerant mixed with air includes a housing having an internal cavity fluidly connected with an ambient atmosphere surrounding the housing via an opening. A subassembly mounted within the internal cavity includes an air chamber fluidly connected with the internal cavity, a non-dispersive infrared sensor operably coupled to the air chamber, a printed circuit board operably coupled to the non-dispersive infrared sensor, and a heat conduction plate mechanically and thermally coupled to the printed circuit board. At least one insulator is arranged within the internal cavity at a position between a portion of the subassembly and the housing. A shell is connectable to the housing in overlapping arrangement with the opening. The shell has at least one shell opening formed therein such that a flow path extends from the shell opening, through the opening formed in the housing to the internal cavity, and into the air chamber.

In addition to one or more of the features described above, or as an alternative to any of the foregoing embodiments the non-dispersive infrared sensor includes a light source and a detector element, the light source and the detector element being mounted to the printed circuit board.

In addition to one or more of the features described above, or as an alternative to any of the foregoing embodiments the air chamber is positioned adjacent to a first side of the printed circuit board, and the heat conduction plate is arranged adjacent to a second, opposite side of the printed circuit board.

In addition to one or more of the features described above, or as an alternative to any of the foregoing embodiments the subassembly further comprises at least one active heating element operably coupled to the non-dispersive infrared sensor.

In addition to one or more of the features described above, or as an alternative to any of the foregoing embodiments the air chamber is defined between a top sensor cover and a bottom sensor cover and at least one of the top sensor cover and the bottom sensor cover has a hole formed therein, the subassembly further comprising a film disposed in overlapping arrangement with the hole, wherein the film is permeable to gas and impermeable to liquid.

In addition to one or more of the features described above, or as an alternative to any of the foregoing embodiments comprising a film disposed in overlapping arrangement with the opening, wherein the film is permeable to gas and impermeable to liquid.

In addition to one or more of the features described above, or as an alternative to any of the foregoing embodiments the housing further comprises a cover and a bottom, and the at least one insulator further comprises a first insulator disposed between the subassembly and the cover and a second insulator positioned between the subassembly and the cover.

In addition to one or more of the features described above, or as an alternative to any of the foregoing embodiments at least one of the first insulator and the second insulator has a groove complementary to a corresponding portion of the subassembly receivable therein.

In addition to one or more of the features described above, or as an alternative to any of the foregoing embodiments the at least one insulator further comprises a shell insulator positioned between the shell and the housing.

According to an embodiment, a refrigerated container system includes a refrigeration system including a closed loop refrigerant circuit having a refrigerant circulating therein and a container having a cargo area arranged in fluid communication with the refrigeration system. A refrigerant detection assembly is operable to detect refrigerant from the closed loop refrigerant circuit mixed with air. The refrigerant detection assembly includes a housing having an internal cavity and an opening such that a flow path extends from the opening into the internal cavity and a subassembly arranged within the internal cavity. The subassembly includes an air chamber fluidly connected to the internal cavity, a non-dispersive infrared sensor operably coupled to the air chamber, a printed circuit board operably coupled to the non-dispersive infrared sensor, and a heat conduction plate thermally coupled to the printed circuit board. At least one insulator is used to mount the subassembly within the internal cavity.

In addition to one or more of the features described above, or as an alternative to any of the foregoing embodiments the refrigeration system includes an evaporator coil and the refrigerant detection assembly is mounted adjacent to the evaporator coil.

In addition to one or more of the features described above, or as an alternative to any of the foregoing embodiments the evaporator coil includes at least one tube arranged within an evaporator housing, and the refrigerant detection assembly is mounted to the evaporator housing.

In addition to one or more of the features described above, or as an alternative to any of the foregoing embodiments the container is a cargo container transportable by a watercraft.

In addition to one or more of the features described above, or as an alternative to any of the foregoing embodiments the refrigerant detection assembly is operable to detect a leak within the closed loop refrigerant circuit within ten seconds of being exposed to 100% of a lower flammability limit.

In addition to one or more of the features described above, or as an alternative to any of the foregoing embodiments the refrigerant detection assembly detects a leak within the closed loop refrigerant circuit when the refrigerant measured by the non-dispersive infrared sensor is at least 25% of a lower flammability limit.

In addition to one or more of the features described above, or as an alternative to any of the foregoing embodiments the non-dispersive infrared sensor is integrally formed with the printed circuit board.

In addition to one or more of the features described above, or as an alternative to any of the foregoing embodiments the subassembly further comprises at least one active heating element operably coupled to the non-dispersive infrared sensor.

In addition to one or more of the features described above, or as an alternative to any of the foregoing embodiments the air chamber is defined between a top sensor cover and a bottom sensor cover and at least one of the top sensor cover and the bottom sensor cover has a hole formed therein, the subassembly further comprising a film disposed in overlapping arrangement with the hole, wherein the film is permeable to gas and impermeable to liquid.

In addition to one or more of the features described above, or as an alternative to any of the foregoing embodiments the refrigerant detection assembly further comprises a shell connectable to the housing in overlapping arrangement with the opening, the shell having at least one shell opening formed therein such that a flow path extends from the shell opening, through the opening formed in the housing to the internal cavity, and into the air chamber.

In addition to one or more of the features described above, or as an alternative to any of the foregoing embodiments comprising at least one shell insulator positioned between the shell and the housing and a film disposed in overlapping arrangement with the opening, the film being permeable to gas and impermeable to liquid.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
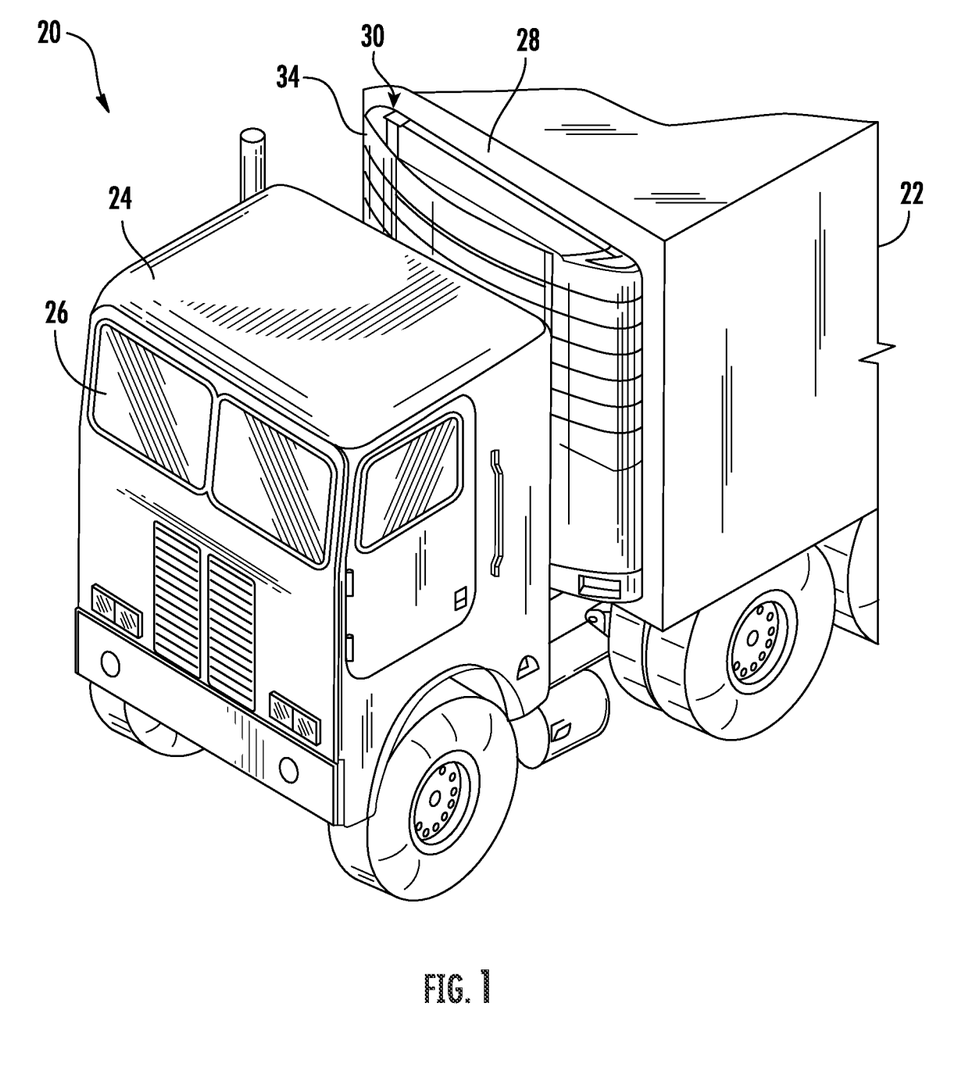
FIG. 1 is a schematic diagram of an example of a transport refrigeration unit.

With reference now to FIG. 1, an example of a transport refrigeration system 20 is illustrated. In the illustrated, non-limiting embodiment, the transport refrigeration system is shown as a trailer system. As shown, the refrigerated container system 20 includes a cargo container or trailer 22 being towed or otherwise transported by a tractor 24 including an operator's compartment or cab 26 and also including an engine (not shown), which acts as the drivetrain system of the system 20. A refrigeration unit 30 is configured to maintain cargo located within the container 22 at a selected temperature by cooling the cargo space of the container 22. As shown, the refrigeration unit 30 is typically mounted at the front wall 28 of the container 22. Together, the refrigeration unit 30 and the cargo container 22 may form a refrigerated container system. It should be appreciated by those of skill in the art that embodiments described herein may be applied to any transport refrigeration system such as, for example shipping containers that are shipped by rail, sea (via a watercraft), or any other suitable container, without use of a tractor 24.

Figure 2:
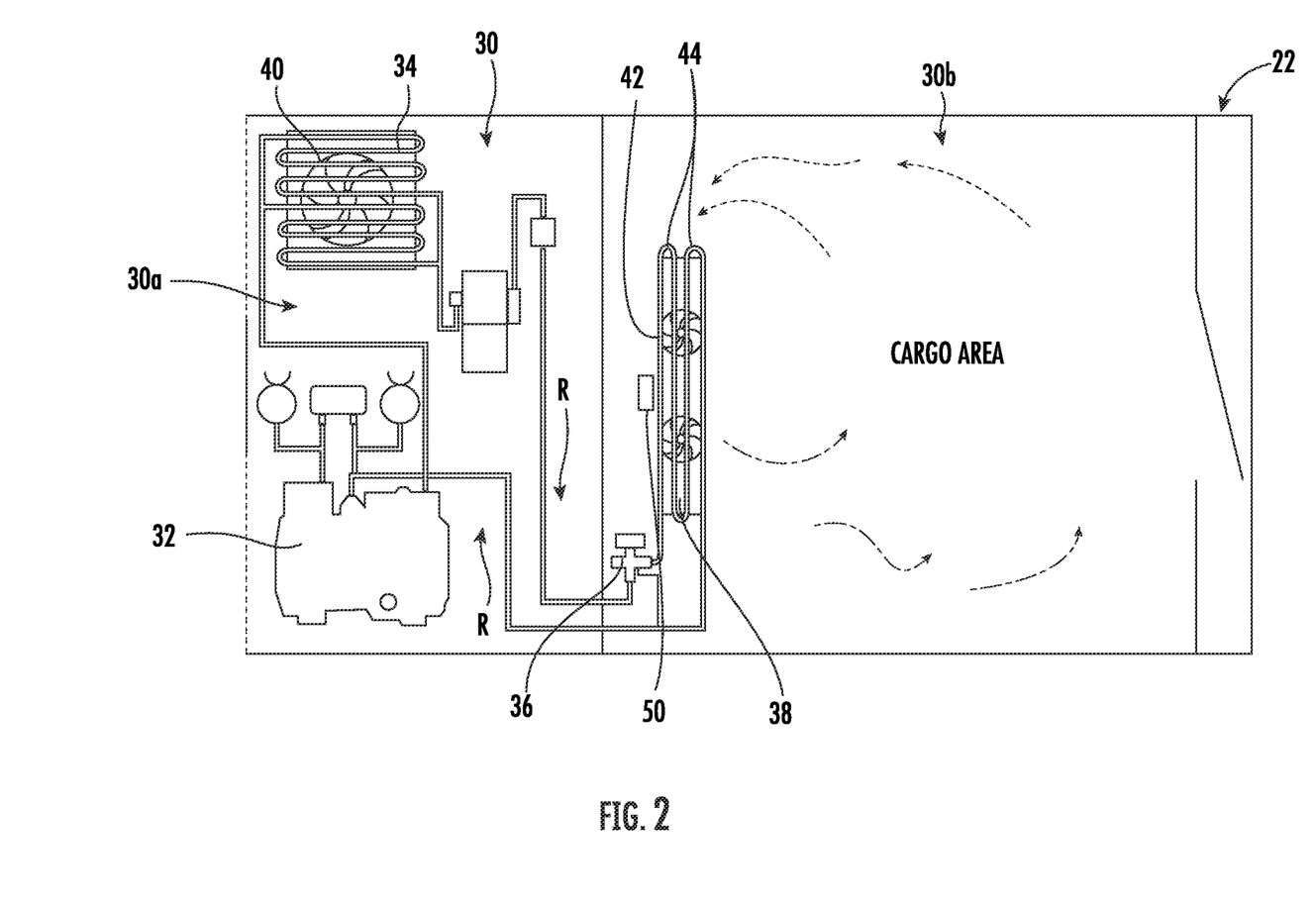
FIG. 2 is a schematic diagram of an exemplary a refrigeration system for cooling a cargo area of a container.

With reference to FIG. 2, a basic refrigeration circuit of the refrigeration unit 30 is shown. The refrigeration unit 30 is divided into two sections, a condenser section 30a and an evaporator section 30b. The condenser section 30a may disposed generally forward of a front wall of the container 22 and is arranged in fluid communication with the ambient atmosphere external to the trailer 22 and the refrigeration unit 30 to exchange air and heat therewith. The evaporator section 30b is not in fluid communication with the ambient atmosphere to control temperature within the trailer 22. The refrigeration unit 30 includes a compressor 32, a condenser coil 34, an expansion device 36, and an evaporator coil 38 fluidly connected to one another to form a closed loop system. A fluid R, such as a refrigerant for example, is configured to flow from the compressor 32 to the condenser coil 34, expansion device 36, and evaporator coil 38 in series. A condenser fan 40, such as driven by a condenser motor (not shown) is configured to move a flow of air across an exterior of the condenser coil 34, and an evaporator fan 42, such as driven by an evaporator motor (not shown), may be used to drive a flow of fluid (air) across an exterior of the evaporator coil 38.

In an embodiment, the refrigerant R circuiting within the refrigeration unit 30 is an A2L refrigerant. The classification of refrigerant is based upon American Society of Heating, Refrigerating and Air-Conditioning (ASHRAE) Standard 34. The standard evaluates each refrigerant's flammability and toxicity and gives it a class referenced as a letter and number combination. The letter refers to the refrigerants' toxicity, and is based on the particular refrigerant's occupational exposure limit (OEL). The number adjacent to the letter refers to the refrigerant's flammability, and is based on the burning velocity (BV), heat of combustion (HOC), and lower flammability limits (LFL) of the particular refrigerant.

With continued reference to FIG. 2, the refrigerant R within the closed loop refrigerant circuit of the refrigeration unit 30 may, in rare instances, leak. When utilizing A2L refrigerants in the refrigeration unit 30, a leak of refrigerant R could lead to undesirable consequences due to the mildly flammable nature of A2L refrigerants. Accordingly, in an embodiment, the refrigeration unit 30 includes at least one refrigerant detection assembly 50 operable to detect a refrigerant leak therein. For example, the evaporator section 30b includes at least one refrigerant detection assembly 50. The at least one refrigerant detection assembly 50 may be mounted to the evaporator housing of the evaporator coil 38 to detect gaseous refrigerant located external to the at least one tube 44 of the evaporator coil 38. However, embodiments where a refrigerant detection assembly 50 is alternatively or additionally arranged at any suitable location relative to the refrigeration unit 30 or the container 22 to detect a leak therein are within the scope of the disclosure. In an embodiment, the refrigerant detection assembly 50 enables the detection of leaks within ten seconds of being exposed to 100% lower flammability limit (LFL). In another embodiment, the refrigerant detection assembly 50 enables the detection of leaks within thirty seconds of being exposed to 25% lower flammability limit (LFL). A lower flammability limit (LFL) of a refrigerant is the minimum concentration limit that is required for the refrigerant to become potentially combustible. It is envisioned that the refrigerant detection assembly 50 described herein may be capable of detecting a leak of at least one A2L refrigerant when the refrigerant detection assembly 50 detects at least 5 to 50% LFL in the sample.

Figure 3:
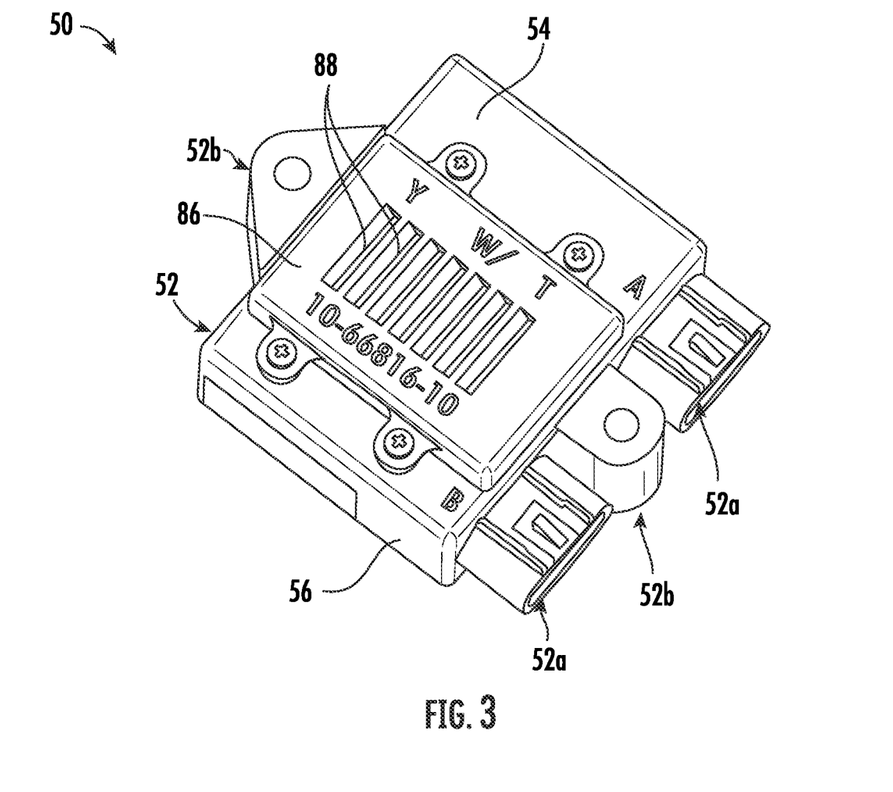
FIG. 3 is a perspective view of an exemplary refrigeration detection assembly according to an embodiment.
Figure 4:
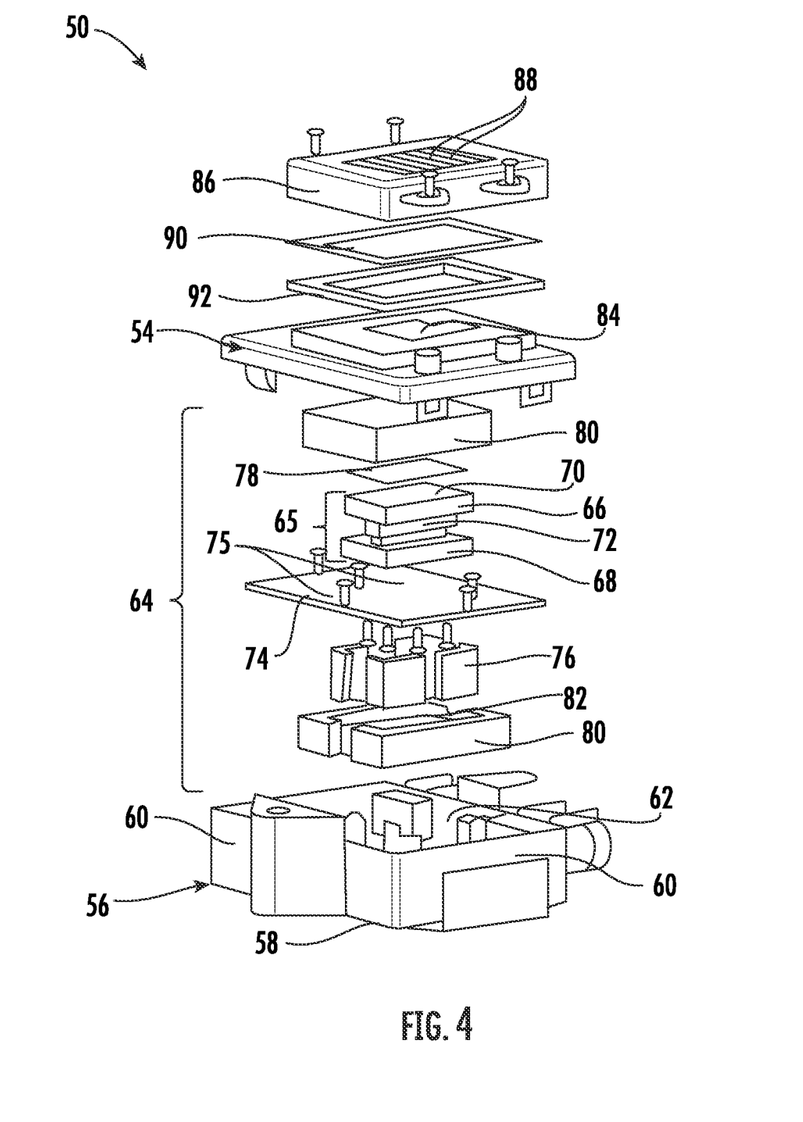
FIG. 4 is an exploded perspective view of an exemplary refrigeration detection assembly according to an embodiment.

An example of a refrigerant detection assembly 50 is illustrated in more detail in FIGS. 3-4. The refrigerant detection assembly 50 includes a housing 52. In the illustrated, non-limiting embodiment, the refrigerant detection assembly 50 is configured to mechanically integrate or couple to refrigerant unit 30 using the mounting holes 52b on the housing 52. Further, the refrigerant detection assembly 50 may be configured to electrically integrate with the refrigerant unit 30 via the connectors 52a on the housing 52. As an example, the mounting holes 52b and connectors 52a are formed as a continuous piece of material 52.

In the illustrated, non-limiting embodiment, the housing 52 is formed from a separate cover 54 and base 56 that are generally complementary in size and shape. The cover 54 and base 56 may be formed from a durable material, such as plastic or resin for example. The cover 54 may be removably coupled to the base 56, such as via a plurality of fasteners, or alternatively, may be permanently affixed thereto. In an embodiment, the base 56 has a bottom 58 and a plurality of sidewalls 60 extending from the bottom 58 such that an internal cavity 62 is defined between the bottom 58 and the plurality of sidewalls 60. Accordingly, the cover 54 may be configured to couple to the distal end of the plurality of sidewalls 60 to seal the cavity 62. However, it should be understood that embodiments where the cavity 62 is formed in the cover 54 and embodiments where the cavity 62 is defined by the cover 54 and the base 56 in combination are also contemplated herein.

A subassembly 64 may be installed within the cavity 62 of the housing 52. The subassembly 64 includes a housing 65 that defines an internal air chamber. In an embodiment, the housing 65 is formed from a removably or permanently coupled top sensor cover 66 and a corresponding bottom sensor cover 68. At least one of the top sensor cover 66 and the bottom sensor cover 68 has an opening or hole 70 formed therein. In the coupled configuration, the top and bottom sensor covers 66, 68 define an air chamber 72 therebetween, the air chamber 72 being fluidly connected with the opening 70.

Further, a sensor such as a non-dispersive infrared (NDIR) sensor for example, may be associated with the air chamber 72. As is known in the art, a NDIR sensor is configured to use light, for example infrared light, to evaluate the absorption characteristics of gas molecules within the light path. The gas molecules are identified and the concentration of the gas molecules may be determined by utilizing the relation (Lambert-Beer law) between the gas concentration and the absorption intensity. In an embodiment, the NDIR sensor is configured to detect the presence of refrigerant molecules, such as an A2L refrigerant for example. Accordingly, when a leak is present, the sample within the air chamber 72 will contain a mixture of air and refrigerant.

A printed circuit board 74 is disposed generally adjacent to a portion, such as the bottom surface for example, of the housing 65. Although the air chamber 72 within the housing 65 functions as a reflective cavity for the optical path of the sensor, the printed circuit board 74 includes the circuitry and/or components associated with operation of the sensor. In an embodiment, the printed circuit board 74 contains the infra-red light source (not shown) and at least one corresponding detector element (not shown). The printed circuit board 74 may additionally include signal amplification and conditioning electronics. In an embodiment, the heat generated by the infra-red light source and/or the other electrical components of the printed circuit board 74 may be sufficient to maintain the sensor at a temperature above ambient to prevent condensation and/or frosting. However, in other embodiments, the printed circuit board 74 additionally includes one or more heating elements disposed throughout and adjacent to the housing 65.

The printed circuit board 74 may be directly connected to a power source, or alternatively, may be adapted to receive one or more batteries sufficient to provide power thereto to operate the refrigerant detection assembly 50 for an extended period of time. In such embodiments, the power provided by the batteries may be the sole source of power used to operate the refrigerant detection assembly 50 or alternatively, may be supplemental to the power source, for example in the event of a failure or loss of power at the power source. The printed circuit board 74 is configured to form an interface between the sensor and the connectors 52b to provide power and data to or from the refrigeration unit 30.

In an embodiment, a heat conduction plate 76 is permanently or removably connected to the printed circuit board 74 opposite the housing 65. The heat conduction plate 76 may be in direct contact with the one or more heating elements 75 or may be indirectly coupled to said heating elements 75. The heat conduction plate 76 may be formed from a material having a high thermal conductivity, such as aluminum for example, to keep the sensor and/or the printed circuit board 74 at a higher temperature relative to surroundings, thereby preventing condensation and frosting conditions. The heat conduction plate 76 is additionally configured to shield the sensor/printed circuit board 74 from electrical noise and emissions within the environment of the container 22. A breathable film 78, selectively permeable to certain elements, may be mounted in overlapping relationship with a portion of the housing 65. In an embodiment, the opening 70 is formed in an upper surface of the top sensor cover 66, and the breathable film 78 is in direct contact with and overlaps the upper surface of the top sensor cover 66. By positioning the breathable film 78 over the opening 70, gasses are able to permeate through the film 78 into the air chamber 72, but contaminants such as dust, oil droplets and moisture in the form of liquid are prevented from entering the air chamber 72 and from damaging the printed circuit board 74.

The subassembly formed by the housing 65, printed circuit board 74, and heat conduction plate 76 is receivable within the cavity 62 of the housing 52. At least one insulator 80 may be used to position or mount the subassembly within the cavity 62. Examples of suitable materials for the insulator(s) 80 include but are not limited to Styrofoam and rubber. In an embodiment, at least one first insulator 80 is arranged between the distal end of the heat conduction plate 76 and an interior surface of the base 56. Alternatively, or in addition, at least one second insulator 80 may be arranged adjacent to the top of the housing 65. Inclusion of the one or more insulators 80 is intended to restrict movement of the subassembly within the cavity 62, dampen any vibrations that may be transferred to the subassembly, and further enhance the weatherproof seal of the subassembly. The insulators 80 may additionally prevent heat loss from the electronics embedded within the printed circuit board 74, active heating elements 75 and heat conduction plate 76.

As shown, an insulator 80 may have a groove 82 formed in a surface thereof, the groove 82 being complementary to the adjacent portion of the subassembly. For example, the insulator 80 positioned adjacent to the base 56 of the housing 52 has a groove 82 complementary in size and shape to the heat conduction plate 76 such that the adjacent portion of the heat conduction plate 76 is seated within the groove 82. Furthermore, an insulator 80 may contain additional groves for accommodating the one or more heating elements 75. Similarly, the insulator 80 positioned adjacent to the cover 54 of the housing 52 may have a groove complementary to the top sensor cover 66, such that the top sensor cover 66 is at least partially received within the groove. The insulators 80 illustrated and described herein are intended as an example only and it should be understood that the use of more than one insulator 80 at each of the positions described herein, as well as the inclusion of one or more insulators 80 at other locations about the subassembly are within the scope of the disclosure.

The cover 54 of the housing 52 has an opening 84 formed therein to define a flow path between the opening and the cavity 62. As a result, the ambient atmosphere or air surrounding the refrigerant detection assembly 50 is configured to flow through the opening 84, into the internal cavity 62 and into the air chamber 72. In an embodiment, a secondary cover or shell 86 is connectable to the cover 54 of the housing 52. The shell 86 is positionable in overlapping arrangement with the opening 84 and may be permanently or removably affixed to the cover 54, such as with a plurality of fasteners for example. Similar to the cover 54, the shell 86 has a shell opening 88 formed therein, the shell opening 88 being arranged in fluid communication with the opening 84 in the cover 54. In the illustrated, non-limiting embodiment, the shell 86 has a plurality of substantially identical shell openings 88 aligned to form a grill. To further protect the subassembly from damage and contamination, a breathable film 90 and/or an insulator, also referred to herein as a shell insulator 92, may be arranged between the exterior of the cover 54 and a portion of the shell 86. In an embodiment, the breathable film 90 is replaceable.

The refrigerant detection assembly 50 components are combined to enable environmental robustness. The printed circuit board 74, breathable films 78, 90, insulator 80 and shell openings 88 may be designed such that in combination these features reduce the impact of moisture on operation of the sensor or detection of refrigerant by limiting water intrusion and reducing condensation buildup. Furthermore, the portions 54, 56 of the housing 52, the internal housing 65, the shell 86, the heat conduction plate 76, and the one or more insulators 80 may be configured to remove condensation when present and/or may be integrated to enable mechanical robustness while allowing fluid connection with the refrigeration unit 30.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigerant detection assembly operable to detect refrigerant mixed with air, the refrigerant detection assembly comprising:
    a housing having an internal cavity fluidly connected with an ambient atmosphere surrounding the housing via an opening;
    a subassembly mounted within the internal cavity, the subassembly comprising:
        a subassembly housing having a top sensor cover and a corresponding bottom sensor cover, wherein when the top sensor cover and the bottom sensor cover are coupled define an air chamber therebetween, the top sensor cover including an opening such that the air chamber is fluidly connected with the internal cavity;
        a non-dispersive infrared sensor operably coupled to the air chamber;
        a printed circuit board operably coupled to the non-dispersive infrared sensor; and
        a heat conduction plate mechanically and thermally coupled to the printed circuit board;
    at least one insulator arranged within the internal cavity at a position between a top of the subassembly housing and the housing to dampen any vibrations that may be transferred to the subassembly; and
    a shell connectable to the housing in overlapping arrangement with the opening, the shell having at least one shell opening formed therein such that a flow path extends from the shell opening, through the opening formed in the housing to the internal cavity, and into the air chamber.

2. The refrigerant detection assembly of claim 1, wherein the non-dispersive infrared sensor includes a light source and a detector element, the light source and the detector element being mounted to the printed circuit board.

3. The refrigerant detection assembly of claim 1, wherein the air chamber is positioned adjacent to a first side of the printed circuit board, and the heat conduction plate is arranged adjacent to a second, opposite side of the printed circuit board.

4. The refrigerant detection assembly of claim 1, wherein the subassembly further comprises at least one active heating element operably coupled to the non-dispersive infrared sensor.

5. The refrigerant detection assembly of claim 4, wherein the air chamber is defined between a top sensor cover and a bottom sensor cover and at least one of the top sensor cover and the bottom sensor cover has a hole formed therein, the subassembly further comprising a film disposed in overlapping arrangement with the hole, wherein the film is permeable to gas and impermeable to liquid.

6. The refrigerant detection assembly of claim 1, further comprising a film disposed in overlapping arrangement with the opening, wherein the film is permeable to gas and impermeable to liquid.

7. The refrigerant detection assembly of claim 1, wherein the housing further comprises a cover and a bottom, and the at least one insulator further comprises a first insulator disposed between the subassembly and the cover and a second insulator positioned between the subassembly and the cover.

8. The refrigerant detection assembly of claim 7, wherein at least one of the first insulator and the second insulator has a groove complementary to a corresponding portion of the subassembly receivable therein.

9. The refrigerant detection assembly of claim 1, wherein the at least one insulator further comprises a shell insulator positioned between the shell and the housing.

10. A refrigerated container system comprising:
a refrigeration system including a closed loop refrigerant circuit having a refrigerant circulating therein; and
a container having a cargo area arranged in fluid communication with the refrigeration system; and
a refrigerant detection assembly operable to detect refrigerant from the closed loop refrigerant circuit mixed with air, the refrigerant detection assembly comprising:
a housing having an internal cavity and an opening such that a flow path extends from the opening into the internal cavity;
a subassembly arranged within the internal cavity, the subassembly including:
a subassembly housing having a top sensor cover and a corresponding bottom sensor cover, wherein when the top sensor cover and the bottom sensor cover are coupled define an air chamber therebetween, the top sensor cover including an opening such that the air chamber is fluidly connected to the internal cavity;
a non-dispersive infrared sensor operably coupled to the air chamber;
a printed circuit board operably coupled to the non-dispersive infrared sensor; and
a heat conduction plate thermally coupled to the printed circuit board; and
at least one insulator for mounting the top of the subassembly housing within the internal cavity.

11. The refrigerated container system of claim 10, wherein the refrigeration system includes an evaporator coil and the refrigerant detection assembly is mounted adjacent to the evaporator coil.

12. The refrigerated container system of claim 11, wherein the evaporator coil includes at least one tube arranged within an evaporator housing, and the refrigerant detection assembly is mounted to the evaporator housing.

13. The refrigerated container system of claim 10, wherein the container is a cargo container transportable by a watercraft.

14. The refrigerated container system of claim 10, wherein the refrigerant detection assembly is operable to detect a leak within the closed loop refrigerant circuit within ten seconds of being exposed to 100% of a lower flammability limit.

15. The refrigerated container system of claim 10, wherein the refrigerant detection assembly detects a leak within the closed loop refrigerant circuit when the refrigerant measured by the non-dispersive infrared sensor is at least 25% of a lower flammability limit.

16. The refrigerated container system of claim 10, wherein the non-dispersive infrared sensor is integrally formed with the printed circuit board.

17. The refrigerated container system of claim 10, wherein the subassembly further comprises at least one active heating element operably coupled to the non-dispersive infrared sensor.

18. The refrigerated container system of claim 17, wherein the air chamber is defined between a top sensor cover and a bottom sensor cover and at least one of the top sensor cover and the bottom sensor cover has a hole formed therein, the subassembly further comprising a film disposed in overlapping arrangement with the hole, wherein the film is permeable to gas and impermeable to liquid.

19. The refrigerated container system of claim 10, wherein the refrigerant detection assembly further comprises a shell connectable to the housing in overlapping arrangement with the opening, the shell having at least one shell opening formed therein such that a flow path extends from the shell opening, through the opening formed in the housing to the internal cavity, and into the air chamber.

20. The refrigerated container system of claim 19, further comprising:
at least one shell insulator positioned between the shell and the housing; and
a film disposed in overlapping arrangement with the opening, the film being permeable to gas and impermeable to liquid.

* * * * *